United States Patent
Sherman

(10) Patent No.: US 10,009,185 B2
(45) Date of Patent: Jun. 26, 2018

(54) CHAIN OF TRUST IDENTIFICATION SYSTEM AND METHOD

(71) Applicant: Intel Corporation, Santa Clara, CA (US)

(72) Inventor: Brent M. Sherman, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 166 days.

(21) Appl. No.: 14/979,091

(22) Filed: Dec. 22, 2015

(65) Prior Publication Data

US 2017/0180356 A1    Jun. 22, 2017

(51) Int. Cl.
    *H04L 29/06*      (2006.01)
    *H04L 9/32*      (2006.01)
    *H04L 9/08*      (2006.01)

(52) U.S. Cl.
CPC .......... *H04L 9/3276* (2013.01); *H04L 9/3271* (2013.01); *H04L 63/0281* (2013.01); *H04L 63/0869* (2013.01); *H04L 63/1483* (2013.01); *H04L 9/0861* (2013.01); *H04L 9/3273* (2013.01); *H04L 63/0823* (2013.01); *H04L 63/0853* (2013.01)

(58) Field of Classification Search
CPC ............. H04L 63/0853; H04L 63/0823; H04L 9/3276; H04L 63/1483; H04L 63/0869; H04L 63/0281; H04L 9/3273; H04L 9/0861
See application file for complete search history.

(56) References Cited

U.S. PATENT DOCUMENTS

| 8,375,207 B2* | 2/2013 | Dangoor | H04L 63/062 380/270 |
| 2006/0033840 A1* | 2/2006 | Diehl | H04N 7/163 348/468 |
| 2009/0265556 A1* | 10/2009 | Lee | G06F 21/10 713/169 |
| 2011/0072274 A1* | 3/2011 | Leoutsarakos | H04L 63/0823 713/182 |

(Continued)

OTHER PUBLICATIONS

Guillou, Louis C, et al., "A practical zero-knowledge protocol fitted to security microprocessors minimizing both transmission and memory", Advances in Cryptology—Eurocrypt '88, LNCS, (1988), 123-128.

*Primary Examiner* — Jayesh M Jhaveri
(74) *Attorney, Agent, or Firm* — Schwegman Lundberg & Woessner, P.A.

(57) ABSTRACT

Embodiments of a system and method for creating a chain of trust are generally described herein. A method may include generating a private secret value, determining a public test value using the private secret value, sending, from a first device in a trusted environment with a second device and a third device, the public test value to the second device, receiving, at the first device outside the trusted environment, a challenge from the third device, determining a verification to the challenge using the private secret value, sending, from the first device outside the trusted environment, the verification to the second device, and receiving, at the first device outside the trusted environment, confirmation from the third device that the verification was successfully verified by the second device and the third device.

22 Claims, 10 Drawing Sheets

(56) References Cited

U.S. PATENT DOCUMENTS

| | | | |
|---|---|---|---|
| 2013/0290714 A1* | 10/2013 | Hans | G06F 21/34 |
| | | | 713/168 |
| 2015/0007273 A1* | 1/2015 | Lin | H04L 63/08 |
| | | | 726/4 |
| 2015/0113275 A1* | 4/2015 | Kim | H04L 9/3273 |
| | | | 713/169 |
| 2017/0041147 A1* | 2/2017 | Krahn | H04L 9/0897 |

* cited by examiner

| | Setup | |
|---|---|---|
| | Verifier | Prover |
| 1 | | Generate (mod $n$) = $p * q$, where $p$ & $q$ are large primes |
| 2 | | Generate a key-pair to satisfy the following inverse modulus equation: $$1 \equiv J * B^v \ (mod \ n), where:$$ $J$ = public<br>$B$ = private (secret)<br>$v$ = public constant<br>($mod \ n$) |
| 3 | ← | Send $(n, v, J)$ |

*FIG. 1*

| | | Verification | |
|---|---|---|---|
| 1 | | | Generate random test value: $T = r^v \ (mod \ n), where:$ $r \in [1, n-1]$ |
| 2 | | ← | Send $T$ |
| 3 | Generate random challenge: $d \in [1, v-1]$ | | |
| 4 | Send $d$ | ⇒ | |
| 5 | | | Compute verification challenge: $D = r * B^d \ (mod \ n)$ |
| 6 | | ← | Send $D$ |
| 7 | Compute test value: $T' = J^d * D^v \ (mod \ n)$ | | |
| 8 | If $T' = T$, then identity has been verified | | |

*FIG. 2*

|   | Verifier | Provers | | |
|---|---|---|---|---|
|   | Node i=4 | Node i=3 | Node i=2 | Node i=1 (Root) |
|   | Setup | | | |
| 1 |   |   |   | Generate $n = p * q$ |
| 2 |   |   |   | Generate $1 \equiv J_1 * B_1^v \pmod{n}$ |
| 3 |   |   |   | Generate $T_1 = r_1^v \pmod{n}$ |
| 4 |   |   | Generate $1 \equiv J_2 * B_2^v \pmod{n}$ | ← Send $(n, v, J_1, T_1)$ |
| 5 |   |   | Generate $T_2 = (r_2 * T_1)^v \pmod{n}$ |   |
| 6 |   | Generate $1 \equiv J_3 * B_3^v \pmod{n}$ | ← Send $(n, v, J_2, T_2)$ |   |
| 7 |   | Generate $T_3 = (r_3 * T_2)^v \pmod{n}$ |   |   |
| 8 | ← Send $(n, v, J_3, T_3)$ |   |   |   |

FIG. 4

| | | | | | Verification | |
|---|---|---|---|---|---|---|
| 1 | Generate challenge $d \in [1, v-1]$ and send | → | | → | | Compute verification challenge: $D_1 = r_1 * B_1^d \pmod{n}$ |
| 2 | | | | Compute test value: $T'_2 = J_1^d * D_1^v \pmod{n}$ | ← | Send $D_1$ |
| 3 | | | | If $T'_2 = T_1$, then compute verification challenge: $D_2 = r_2 * T_1 * B_2^d \pmod{n}$ Else $D_2 = 1$ | | |
| 4 | | | Compute test value: $T'_3 = J_2^d * D_2^v \pmod{n}$ | ← Send $D_2$ | | |
| 5 | | | If $T'_3 = T_2$, then compute verification challenge: $D_3 = r_3 * T_2 * B_3^d \pmod{n}$ Else $D_3 = 1$ | | | |
| 6 | Compute test value: $T'_4 = J_3^d * D_3^v \pmod{n}$ | ← Send $D_3$ | | | | |
| 7 | If $T'_4 = T_3$, then chain has been verified and is now trusted | | | | | |

*FIG. 5*

|   | Verifier | Provers | | |
|---|---|---|---|---|
|   | Node i=4 | Node i=3 | Node i=2 | Node i=1 (Root) |
| | | Setup | | |
| 1 | | | | p=5051<br>q=3519<br>n=17774469 |
| 2 | | | | $B_1 = 9752435$<br>$J_1 = 4958848$<br>v=8147336 |
| 3 | | | | $r_1 = 7559163$<br>$T_1 = 4561065$ |
| 4 | | | $B_2 = 2622376$<br>$J_2 = 3288088$ | ← Send $(n, v, J_1, T_1)$ |
| 5 | | | $r_2 = 243496$<br>$T_2 = 16418259$ | |
| 6 | | $B_3 = 597008$<br>$J_3 = 2784958$ | ← Send $(n, v, J_2, T_2)$ | |
| 7 | | $r_3 = 88906$<br>$T_3 = 4031262$ | | |
| 8 | ← Send $(n, v, J_3, T_3)$ | | | |
| | | Verification | | |
| 1 | d= 6421583 → | → | → | $D_1 = 13845906$ |
| 2 | | | $T'_2 = 4561065$ | ← Send $D_1$ |
| 3 | | | $T'_2 = T_1$, then<br>$D_2 = 393525$ | |
| 4 | | $T'_3 = 16418259$ | ← Send $D_2$ | |
| 5 | | $T'_3 = T_2$, then<br>$D_3 = 16812441$ | | |
| 6 | $T'_4 = 4031262$ | ← Send $D_3$ | | |
| 7 | $T'_4 = T_3$, chain is verified and now trusted | | | |

*FIG. 6*

CHAIN OF TRUST IDENTIFICATION SYSTEM AND METHOD

TECHNICAL FIELD

Embodiments pertain to identifying a chain of trust. Some embodiments relate to a chain of trust of Internet of Things (IoT) devices.

BACKGROUND

Internet of Things (IoT) devices are devices in a network that often include sensors and limited computing power. IoT devices have broad applicability and each IoT device is typically specialized to its particular use and environment. IoT devices are used in homes, businesses, industrial applications, vehicles, security, optimization, and improving connectivity. IoT devices communicate with each other directly and communicate with other networks and with the broader internet. IoT devices communicate using secured and unsecured networks.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 1 illustrates a setup phase of a GQ Identification Scheme.

FIG. 2 illustrates a verification phase of a GQ Identification Scheme.

FIG. 4 illustrates an example of a setup phase of the cascading GQ protocol in a four node network.

FIG. 5 illustrates an example of a verification phase of the cascading GQ protocol in a four node network.

FIG. 6 illustrates an example of the cascading GQ protocol using exemplary values.

DETAILED DESCRIPTION

Figure 3:
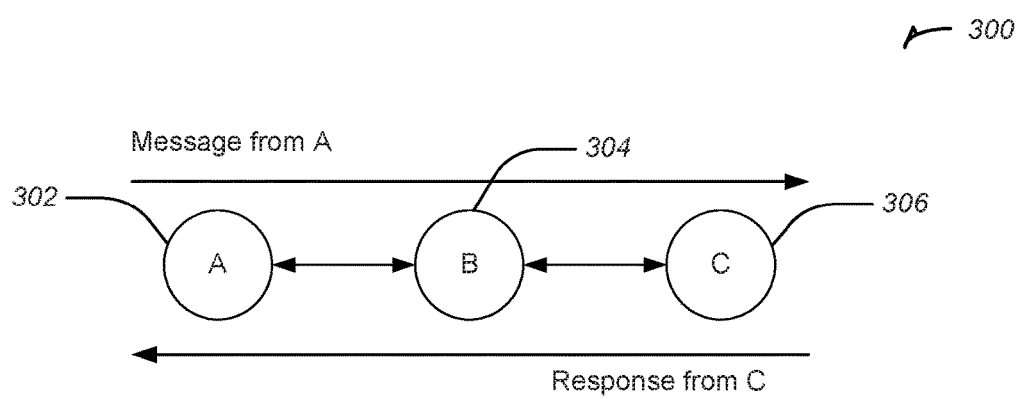
FIG. 3 illustrates an example of a communication chain among devices in accordance with some embodiments.

Identifying a chain of trust for Internet of Things (IoT) devices may be challenging. The devices may not be in contact with a centralized device or controller. An IoT device may face other challenges in verifying a chain of trust if the IoT device does not know the devices it is using in the potential chain of trust or if the IoT device is not able to verify the devices are properly identified. An identification scheme may be used to verify a chain of trust.

A Guillou-Quisquater Identification (GQ) Scheme is a zero-knowledge protocol used to authenticate an entity. It was designed for small, simple devices such as smart cards, due to the low memory and transmission requirements of the scheme. The protocol also does not require a cryptography engine which most small, simple devices do not possess. The scheme may be used for Internet of Things (IoT) devices, such as when peer-to-peer (P2P) communication is supported.

The GQ Identification Scheme is detailed below in FIGS. 1 and 2. In FIGS. 1 and 2, p and q are very large prime numbers or co-prime numbers, and an equation is used to determine the modulus of n, mod(n), by multiplying p and q. Generally, a trusted entity may supply the value B, or the value B may represent a secret known by the prover. In an example of the GQ scheme, the prover is attempting to prove that it knows the secret without actually revealing the secret to the verifier (and without exposing the secret to a man-in-the-middle (MITM) attack). A public value v is selected by the prover and then a value J is determined using the secret (B), the public value v, and mod(n). The calculated value J, as well as the public value v, and the value n from mod(n), are sent to the verifier. In another example, the public value v is only known by entities that are trusted by a trusted entity, and the prover would not send the public value v in this example. In this example, the verifier would receive the value v from the trusted entity. The prover generates a random test value, and using the random test value, the public value v, and mod(n), determines a T value to send to the verifier. The verifier then creates a random challenge value, such as a value between 1 and (v−1), and sends the challenge value to the prover. The prover uses the challenge value, the secret, the random test value, and mod(n) to determine a challenge verification D, which it then sends to the verifier. The verifier uses the challenge verification D to determine T'. The verifier then compares T' to T to determine whether they are equal. When they are equal, the verifier knows that the prover knows the secret, without the prover sending the secret (or the random test value) to the verifier (and thus not exposing the secret to a MITM attack).

FIG. 1 illustrates a setup phase of a GQ Identification Scheme. The setup phase of FIG. 1 includes generating a public value J from a private secret B, and sending the public value J as well as a number n based on a modulus of two large primes and a public constant. The public value J and the private secret B generate an inverse modulus equation 1 ≡J*B$^v$ (mod n). In an example, the GQ Identification Scheme initiated in the setup phase shown in FIG. 1 includes receiving the private secret B from a trusted third party.

FIG. 2 illustrates a verification phase of a GQ Identification Scheme. The verification phase of FIG. 2 includes generating a random test value at the root device and sending it to the end device. The end device then generates a random challenge and sends it to the root device. The root device computes the verification challenge and sends it back to the end device, which is then able to verify the root device.

Proof that the GQ protocol works is shown below:

$$T' = J^d * (r * B^d)^v (\text{mod } n)$$
$$= (J * B^v)^d * r^v (\text{mod } n)$$
$$= (1)^d * r^v (\text{mod } n)$$
$$= T$$

FIG. 3 illustrates an example of a communication chain 300 among devices in accordance with some embodiments. A modified GQ scheme may be used when communication involves multiple entities to complete the operation. The GQ scheme may be extended to support a multi-link IoT network to create a "chain of trust." The GQ scheme is a secure and robust protocol and works well in P2P scenarios. The communication chain 300 represents a series of P2P connections over several endpoints.

In order for endpoint A 302 to communicate with endpoint C 306, it must rely on endpoint B 304 to complete the operation. To mitigate man-in-the-middle (MITM) attacks, all entities must be authenticated to establish a chain of trust. The GQ scheme may be extended, without modifying its security claims, in order to support such a requirement.

Many IoT networks support P2P communication between endpoints (e.g., mobile devices, IoT devices, etc.) which may result in multiple-link communication. For example, endpoint A 302 may need to communicate with endpoint C 306 by way of endpoint B 304 due to either distance or some other restriction(s). Since C 306 is not directly accessible by A 302, A 302 relies on B 304 to ensure proper communication is performed. This scenario may be vulnerable to MITM attacks. If no trust is established among the three endpoints, a malicious device(s) could be inserted in the communication path to alter, divert, or drop messages or steal information. This is a high concern in safety-critical implementation, such as a prison security system, where endpoints communicate and depend on each other. The GQ scheme includes a RSA modulus, such as using large co-primes, which provides enough robustness to mitigate MITM attacks. By extending the GQ scheme to support multiple endpoint-communication, a trust chain may be created.

New values for the cascading GQ scheme include:

$$T_i = (r_i * T_{i-1})^v (\mod n)$$

$$D_i = r_i * T_{i-1} * B_i^d (\mod n)$$

$$T'_i = J_{i-1}^d * D_{i-1}^v (\mod n)$$

Where $T_0=1$, $i=1 \to \lim$

FIG. 4 illustrates an example of a setup phase of the cascading GQ protocol in a four node network. FIG. 5 illustrates an example of a verification phase of the cascading GQ protocol in a four node network. The number of devices between the root node and the verifier node may be changed (e.g., it may be a single device between the root and verifier, two as shown in the example in FIGS. 4 and 5, dozens, or hundreds, etc.). The cascading GQ protocol may differ from the GQ protocol in one or more ways. In an example, the cascading GQ protocol uses a first prover to send the n, v, and J1 values, and also sends a T1 value to a first middle node as shown in FIG. 4 (e.g., node 2, also a prover). Each middle node between the initial root prover and the verifier/end node may act as a prover and verifier. For example, prover node 2 may generate J2 and T2 values using a second random value r2 and received values for v, n, J1, and T1, as well as a second secret value B2.

In another example, each prover node may have a unique secret, $B_i$, specific to that node (and secret to that node). The cascading GQ protocol uses each unique secret to have each node (other than the initial node) verify that the information received at that node in the verification phase is correct based on information received during the setup phase.

As shown in FIG. 5, the verification phase may include a generated challenge by the end device sent back to the root device, which may include directly or indirectly sending the challenge to the root device (e.g., through the two middle nodes). The root device may determine a verification to the challenge, and send the verification to the first middle node. The first middle node may then determine if the verification is valid for the first middle node's secret value, and if so, send a second secret value T2' to the second middle node. This process may continue until the end node is reached. The end node may verify that the verification to the challenge is correct for all the nodes in the chain, or just the final middle node.

Proof that the cascading GQ protocol works is shown below:

$$T'_i = J_{i-1}^d * D_{i-1}^v (\mod n)$$
$$= J_{i-1}^d * (r_{i-1} * T_{i-2} * B_{i-1}^d)^v (\mod n)$$
$$= (1)^d * (r_{i-1} * T_{i-2})^v (\mod n)$$
$$= T_{i-1}$$

In an example, the root node of FIG. 4 may send a second test value along with the T1 value in the setup phase. For example, the root node may send two T values and designate a first T value to be T1 and a second T value for use in a later verification. After the verification shown in FIG. 5 is completed, if the verifier node may request a second verification, and the second T value may be used to re-verify the root node, using the verification operations of FIG. 5 a second time, but with the second T value. In another example, a plurality of test values (T values) may be sent during the setup phase for later use in verification. The prover nodes (e.g., nodes 2 and 3 ) may verify each of the T values and relay the results to the verifier node. The verifier node may store the resulting T values (e.g., a corresponding T3 for each of the initial test values) to be used for later verification. The verification may be run a plurality of times without re-running the setup phase for each of the T values sent and stored by the verifier node.

In a system that does not use the techniques described in FIGS. 4 and 5, allowing multiple verification actions for a single setup may expose a system to replay attacks. Using different test values (T values) for each verification eliminates replay attacks, because the T value is not repeated. A malicious device attempting to insert itself into the verification process without having gone through the setup would be unable to guess the T value in real-time due to the prime or co-prime values being difficult to guess. If the T value is repeated, the malicious device may determine the T value if enough time passes between a first verification and a next verification. Eliminating the repetition of the T value limits the malicious device to attempting to guess each new T value in real-time, which is practically impossible.

FIG. 6 illustrates an example of the cascading GQ protocol using exemplary values. The Example shown in FIG. 6 may include different values and is intended to illustrate one example. In another example, different values of p and q may be selected using higher primes to add security to the scheme.

Figure 7A:
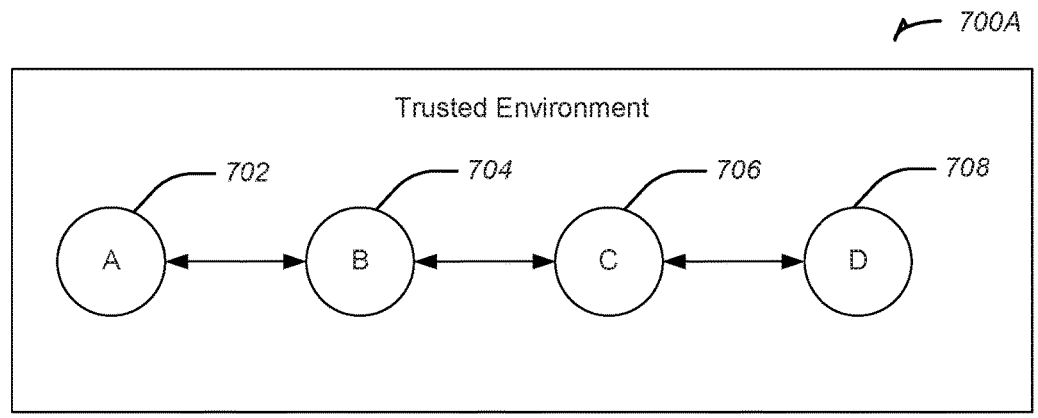
FIG. 7A illustrates an initial trusted environment for setup of identification of a chain of trust in accordance with some embodiments.
Figure 7B:
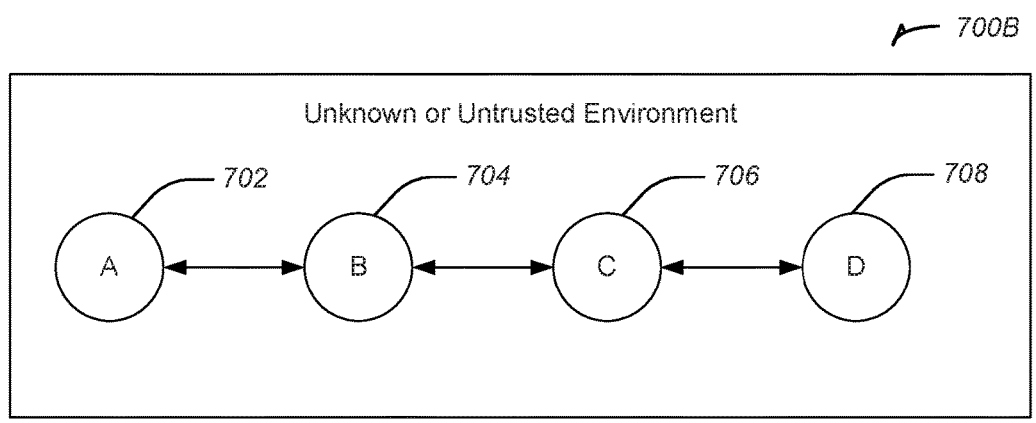
FIG. 7B illustrates an unknown or untrusted environment for verification of identification of a chain of trust in accordance with some embodiments.

FIG. 7A illustrates an initial trusted environment 700A for setup of identification of a chain of trust in accordance with some embodiments. FIG. 7B illustrates an unknown or untrusted environment 700B for verification of identification of a chain of trust in accordance with some embodiments. In an example, FIGS. 7A and 7B include four devices 702, 704, 706, and 708. It is understood that the number of devices may vary so long as there are at least three devices in the chain of trust. As such, in examples, three devices, five, ten, hundreds, etc., numbers of devices may be used.

The cascading GQ protocol described above to verify a chain of trust may be used in the environments 700A and 700B. For example, in the trusted environment 700A, a setup phase to establish a chain of trust may be initiated. The setup phase described above in FIG. 4 may use the trusted environment 700A to send initial values without concern of a MITM attack. For example, trusted environment 700A may include wired connections, known wireless connections, or the like. In an example, trusted environment 700A includes connections between the devices (e.g., between 702 and 704, between 704 and 706, etc.) in the chain of trust over a wireless connection of a first type, such as connections over Bluetooth, using a single wireless access point, with additional security measures (e.g., physical proximity), through a secure server or hub (e.g., an IoT hub) or the like.

In an example, the unknown or untrusted environment 700B may include an unknown environment, such as an environment where the connections between the various devices have an unknown security level. In another example, the environment 700B may include a known untrusted environment where attacks are prevalent, consistent, possible, have already occurred, or are otherwise assumed to be occurring or possible. In yet another example, the environment 700B may include a combination of known or unknown, secure or unsecured connections. For example, the connection between device A 702 and device B 704 may be known to device A 702 to be secure, but device A 702 may not know the status of connections between device B 704 and device C 706, or device C 706 and device D 708. In another example, the connection between device A 702 and device B 704 may be known to be secure, but the connection between device B 704 and device C 706 may be unsecure, either by design, because it is unknown, or because of a malicious attack. In this example, even if the connection between device C 706 and device D 708 is known to be secure, the chain of trust may not be established due to the unknown or compromised link between devices B 704 and C 706. A chain of trust may only be established if each of connections from the root device to the end device are secure.

Figure 8:
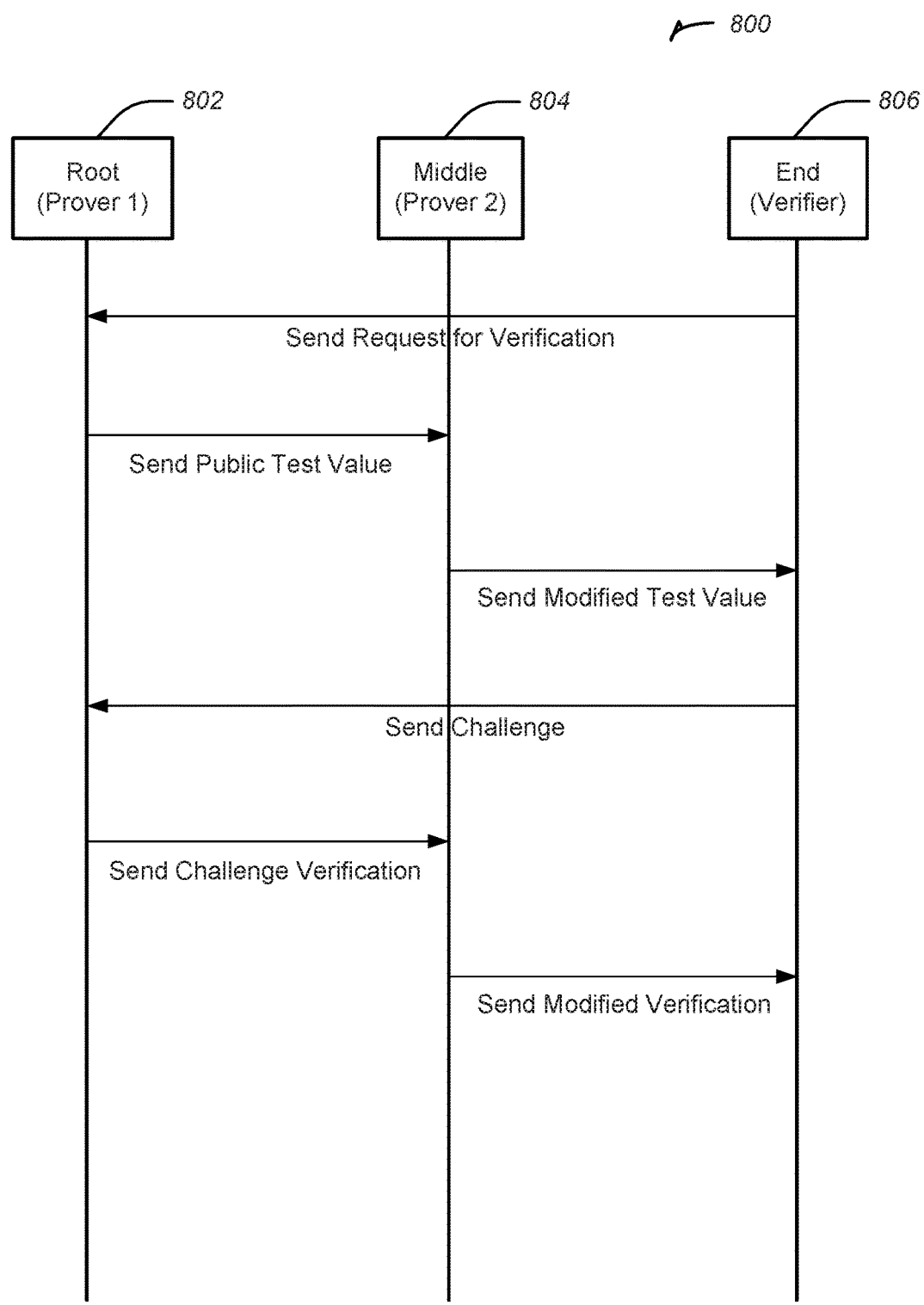
FIG. 8 illustrates generally a diagram showing a chain of trust identification process in accordance with some embodiments.

FIG. 8 illustrates generally a diagram 800 showing a chain of trust identification process in accordance with some embodiments. Diagram 800 includes exemplary devices, such as a first prover device, called a root device 802, a second prover device, called a middle device 804, and a verifier device, called an end device 806. In an example, end device 806 sends a request for verification to the root device 802. In response, the root device 802 sends a public test value to middle device 804. The middle device 804 modifies the incoming public test value according to a secret value held by the middle device 804 and a random value selected by the middle device 804. The middle device 804 then forwards a modified test value to the end device 806. The end device 806 issues a challenge that it sends back to the root device 802. In an example, the end device 806 is not in direct communication with the root device 802, and the message is conveyed by the middle device 804. In another example, the challenge may be issued to the root device 802 using other communication methods, such as through a central device (not shown) or directly. After receiving the challenge, the root device 802 sends a challenge verification to the middle device 804. The middle device 804 modifies the challenge verification using the secret value held by the middle device 804 and the random value previously selected by the middle device 804.

The middle device 804 then sends the modified verification to the end device 806. The middle device 804 may first verify the incoming challenge verification from the root device 802 before sending the modified verification. If the incoming verification challenge is not proven to the middle device 804, the middle device 804 may abort the verification process. The middle device 804 may then notify the root device 802, the end device 806, or both, that the challenge was not verified. If the incoming verification challenge is proven, the middle device 804 may send the modified verification to the end device 806. In another example, the middle device 804 does not attempt to verify the challenge verification, and sends the modified verification to the end device 806 regardless of the status of the challenge verification. The end device 806 then determines if the received modified verification is valid. If the received modified verification is valid, the end device 806 may send confirmation to the middle device 804, the root device 802, or both. In another example, the end device 806 does not send a confirmation. In an example, the middle device 804 may include a plurality of devices, repeating the receive, modify, and send operations detailed above, for any number of devices between the root device 802 and the end device 806.

Figure 9:
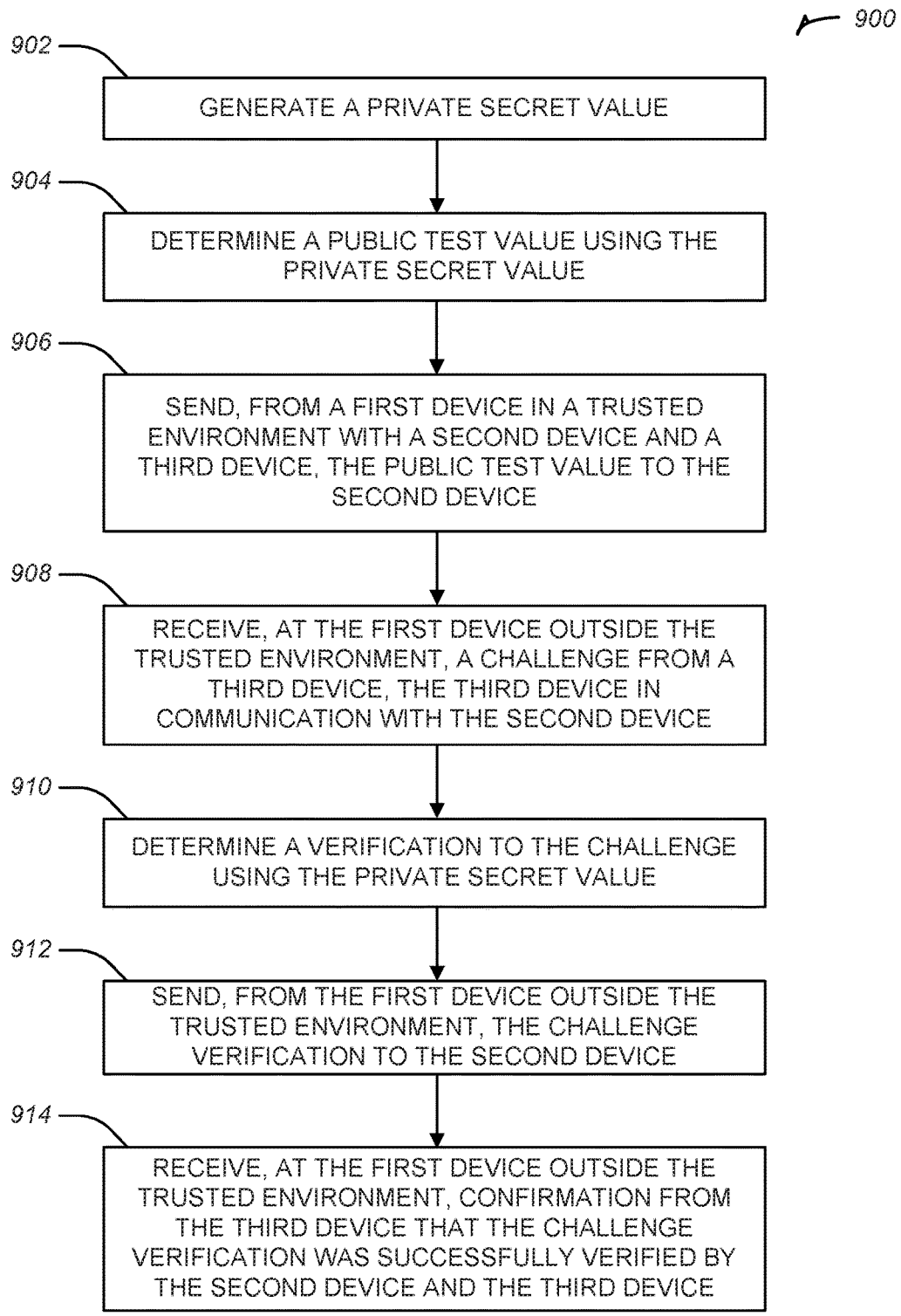
FIG. 9 illustrates a flowchart showing a technique for create a chain of trust in accordance with some embodiments.

FIG. 9 illustrates a flowchart showing a technique 900 for create a chain of trust in accordance with some embodiments. The technique 900 includes an operation 902 to generate a private secret value using a random number generator, selecting a value using a predetermined technique, receiving an input from a trusted source, etc. The technique 900 includes an operation 904 to determine a public test value using the private secret value. The public test value may be determined using a modulus value, the modulus value including a product of two large, distinct prime numbers. Determining the public test value may include using a public constant. The technique 900 includes an operation 906 to send, from a first device in a trusted environment, with a second device and a third device, the public test value to the second device. Sending the public test value may include sending the public constant to the second device.

The technique 900 includes an operation 908 to receive, at the first device outside the trusted environment, a challenge from the third device, the third device in communication with the second device. The technique 900 includes an operation 910 to determine a verification to the challenge using the private secret value. The verification may be determined using the modulus value. The technique 900 includes an operation 912 to send, from the first device outside the trusted environment, the challenge verification to the second device. Sending the challenge verification may include sending a second public test value to the second device, such as a second public test value to be used for a second verification without an additional setup phase (e.g., without sending the public test value to the second device).

The technique 900 includes an operation 914 to receive, at the first device outside the trusted environment, confirmation from the third device that the challenge verification was successfully verified by the second device and the third device. Receiving confirmation may include receiving a second challenge from the third device. The technique may include an operation to determine, in response to receiving the second challenge, a second verification to the second challenge using a second private secret value. The technique may include sending the second verification to the second device. Receiving confirmation from the third device may include receiving confirmation from the third device that the challenge verification was successfully verified by a fourth device, and the third device may be in communication with the second device via the fourth device.

The technique may include an operation to send a secure communication to the third device via the second device using the chain of trust. The device may include an IoT device. The trusted environment may include an Institute of Electrical and Electronics Engineers (IEEE) 802.11 wireless network. Receiving the challenge from the third device may include receiving the challenge over an unsecured network.

Figure 10:
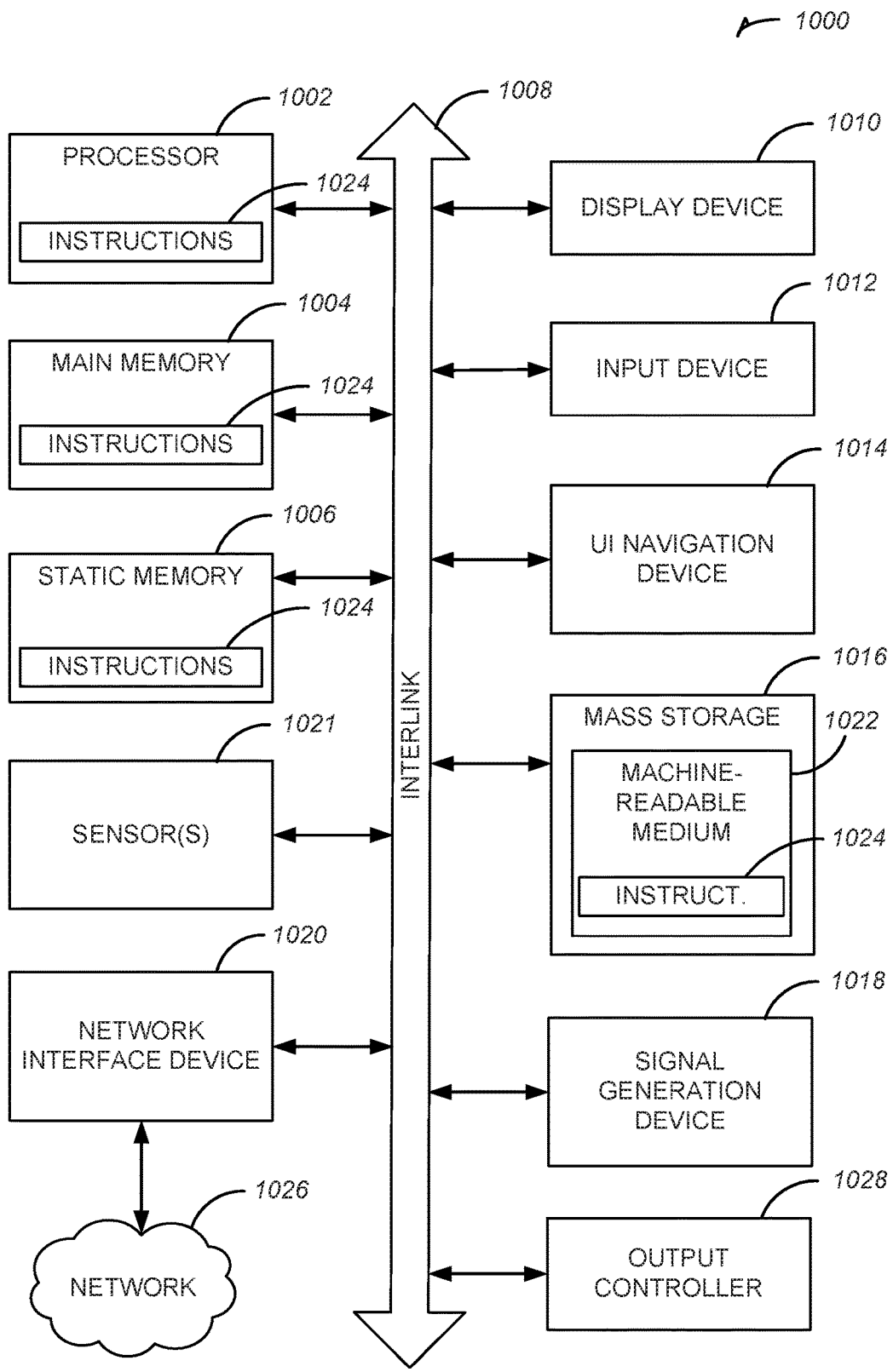
FIG. 10 illustrates generally an example of a block diagram of a machine upon which any one or more of the techniques (e.g., methodologies) discussed herein may perform in accordance with some embodiments.

FIG. 10 illustrates generally an example of a block diagram of a machine 1000 upon which any one or more of the techniques (e.g., methodologies) discussed herein may perform in accordance with some embodiments. In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environment. The machine 1000 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 1000 may include a hardware processor 1002 (e.g., a central processing unit (CPU), a graphics processing unit (GPU), a hardware processor core, or any combination thereof), a main memory 1004 and a static memory 1006, some or all of which may communicate with each other via an interlink (e.g., bus) 1008. The machine 1000 may further include a display unit 1010, an alphanumeric input device 1012 (e.g., a keyboard), and a user interface (UI) navigation device 1014 (e.g., a mouse). In an example, the display unit 1010, alphanumeric input device 1012 and UI navigation device 1014 may be a touch screen display. The machine 1000 may additionally include a storage device (e.g., drive unit) 1016, a signal generation device 1018 (e.g., a speaker), a network interface device 1020, and one or more sensors 1021, such as a global positioning system (GPS) sensor, compass, accelerometer, or other sensor. The machine 1000 may include an output controller 1028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1016 may include a machine readable medium 1022 that is non-transitory on which is stored one or more sets of data structures or instructions 1024 (e.g., software) embodying or utilized by any one or more of the techniques or functions described herein. The instructions 1024 may also reside, completely or at least partially, within the main memory 1004, within static memory 1006, or within the hardware processor 1002 during execution thereof by the machine 1000. In an example, one or any combination of the hardware processor 1002, the main memory 1004, the static memory 1006, or the storage device 1016 may constitute machine readable media.

While the machine readable medium 1022 is illustrated as a single medium, the term "machine readable medium" may include a single medium or multiple media (e.g., a centralized or distributed database, and/or associated caches and servers) configured to store the one or more instructions 1024.

The term "machine readable medium" may include any medium that is capable of storing, encoding, or carrying instructions for execution by the machine 1000 and that cause the machine 1000 to perform any one or more of the techniques of the present disclosure (e.g., a non-transitory medium), or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1024 may further be transmitted or received over a communications network 1026 using a transmission medium via the network interface device 1020 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1020 may include one or more physical jacks (e.g., Ethernet, coaxial, or phone jacks) or one or more antennas to connect to the communications network 1026. In an example, the network interface device 1020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1000, and includes digital or analog communications signals or other intangible medium to facilitate communication of such software.

VARIOUS NOTES & EXAMPLES

Each of these non-limiting examples may stand on its own, or may be combined in various permutations or combinations with one or more of the other examples.

Example 1 is a method (e.g., executing on a computer system, or embodied in instructions of a computer-readable medium) to create a chain of trust, the method comprising: generating a private secret value; determining a public test value using the private secret value; sending, from a first device in a trusted environment with a second device and a third device, the public test value to the second device; receiving, at the first device outside the trusted environment, a challenge from the third device, the third device in communication with the second device; determining a verification to the challenge using the private secret value; sending, from the first device outside the trusted environment, the challenge verification to the second device; and receiving, at the first device outside the trusted environment, confirmation from the third device that the challenge verification was successfully verified by the second device and the third device.

In Example 2, the subject matter of Example 1 optionally includes, further comprising sending a secure communication to the third device via the second device using the chain of trust.

In Example 3, the subject matter of any one or more of Examples 1-2 optionally include, wherein the public test value and the verification are determined using a modulus value, the modulus value including a product of two large, distinct prime numbers.

In Example 4, the subject matter of any one or more of Examples 1-3 optionally include, wherein sending the challenge verification to the second device includes sending a second public test value to the second device.

In Example 5, the subject matter of Example 4 optionally includes, wherein receiving the confirmation from the third device includes receiving a second challenge from the third device.

In Example 6, the subject matter of Example 5 optionally includes, further comprising: determining, in response to receiving the second challenge, a second verification to the second challenge using a second private secret value; and sending the second verification to the second device.

In Example 7, the subject matter of any one or more of Examples 1-6 optionally include, wherein receiving confirmation from the third device includes receiving confirmation from the third device that the challenge verification was successfully verified by a fourth device, and wherein the third device is in communication with the second device via the fourth device.

In Example 8, the subject matter of any one or more of Examples 1-7 optionally include, wherein determining the public test value includes using a public constant.

In Example 9, the subject matter of Example 8 optionally includes, wherein sending the public test value to the second device includes sending the public constant to the second device.

In Example 10, the subject matter of any one or more of Examples 1-9 optionally include, wherein the first device is an Internet of Things device.

In Example 11, the subject matter of any one or more of Examples 1-10 optionally include, wherein the trusted environment includes an Institute of Electrical and Electronics Engineers (IEEE) 802.11 wireless network.

In Example 12, the subject matter of Example 11 optionally includes, wherein receiving, at the first device outside the trusted environment, the challenge from the third device includes receiving the challenge over an unsecured network.

Example 13 is at least one machine-readable medium including instructions for operation of a computing system, which when executed by a machine, cause the machine to perform operations of any of the methods of Examples 1-12.

Example 14 is an apparatus comprising means for performing any of the methods of Examples 1-12.

Example 15 is a first device for communicating over a chain of trust, the first device comprising: processor logic, implemented at least partly in hardware (e.g., with software-programmed hardware circuitry) to: generating a private secret value; and determining a public test value using the private secret value; and transceiver logic, implemented at least partly in hardware (e.g., with software-programmed hardware circuitry) to: send, over a trusted connection with a second device, the public test value to the second device; receive, outside the trusted connection, a challenge from a third device, the third device in communication with the second device; send, outside the trusted connection, a verification to the challenge to the second device; and receive, outside the trusted connection, confirmation from the third device that the challenge verification was successfully verified by the second device and the third device.

In Example 16, the subject matter of Example 15 optionally includes, wherein the processing logic is to determine the verification to the challenge using the private secret value.

In Example 17, the subject matter of any one or more of Examples 15-16 optionally include, wherein the transceiver logic is further to send a secure communication to the third device via the second device using the chain of trust.

In Example 18, the subject matter of any one or more of Examples 15-17 optionally include, wherein the public test value is determined using a modulus value, the modulus value including a product of two large, distinct prime numbers.

In Example 19, the subject matter of any one or more of Examples 15-18 optionally include, wherein to send the verification to the second device includes to send a second public test value to the second device.

In Example 20, the subject matter of Example 19 optionally includes, wherein to receive the confirmation from the third device includes to receive a second challenge from the third device.

In Example 21, the subject matter of Example 20 optionally includes, wherein the processing logic is to determine, in response to receiving the second challenge, a second verification to the second challenge using a second private secret value; and wherein the transceiver logic is to send the second verification to the second device.

In Example 22, the subject matter of any one or more of Examples 15-21 optionally include, wherein to receive confirmation from the third device includes to receive confirmation from the third device that the challenge verification was successfully verified by a fourth device, and wherein the third device is in communication with the second device via the fourth device.

In Example 23, the subject matter of any one or more of Examples 15-22 optionally include, wherein to determine the public test value includes to determine the public test value using a public constant.

In Example 24, the subject matter of Example 23 optionally includes, wherein to send the public test value to the second device includes to send the public constant to the second device.

In Example 25, the subject matter of any one or more of Examples 15-24 optionally include, wherein the first device is an Internet of Things device.

In Example 26, the subject matter of any one or more of Examples 15-25 optionally include, wherein the trusted connection includes a connection using an Institute of Electrical and Electronics Engineers (IEEE) 802.11 wireless network.

In Example 27, the subject matter of Example 26 optionally includes, wherein to receive, outside the trusted connection, the challenge from the third device includes to receive the challenge over an unsecured network.

Example 28 is a method (e.g., executing on a computer system, or embodied in instructions of a computer-readable medium) to create a chain of trust, the method comprising: generating, at a first device, a private secret value, a public constant, a modulus value, and a random test value; determining a public value using the private secret value, the public constant, and the modulus value; determining a public test value using the public constant, the modulus value, and the random test value; sending, from a first device in a trusted environment with a second device and a third device, the public constant, the modulus value, the public value, and the public test value to the second device; receiving, at the first device outside the trusted environment, a random challenge value from a third device, the third device in communication with the second device; determining a challenge verification value using the random test value, the private secret value, the random challenge value, and the modulus value; and sending, from the first device outside the trusted environment, the challenge verification value to the second device.

In Example 29, the subject matter of Example 28 optionally includes, further comprising receiving, at the first device outside the trusted environment, confirmation from the third device that the challenge verification value was successfully verified by the second device and the third device.

Example 30 is at least one machine readable medium including instructions that, when executed, cause the machine to perform operations for creating a chain of trust, the operations comprising: generating a private secret value; determining a public test value using the private secret value; sending, from a first device in a trusted environment with a second device and a third device, the public test value to the second device; receiving, at the first device outside the trusted environment, a challenge from a third device, the third device in communication with the second device; determining a verification to the challenge using the private secret value; sending, from the first device outside the trusted environment, the challenge verification to the second device; and receiving, at the first device outside the trusted environment, confirmation from the third device that the challenge verification was successfully verified by the second device and the third device.

In Example 31, the subject matter of Example 30 optionally includes, further comprising sending a secure communication to the third device via the second device using the chain of trust.

In Example 32, the subject matter of any one or more of Examples 30-31 optionally include, wherein the public test value and the verification are determined using a modulus value, the modulus value including a product of two large, distinct prime numbers.

In Example 33, the subject matter of any one or more of Examples 30-32 optionally include, wherein sending the challenge verification to the second device includes sending a second public test value to the second device.

In Example 34, the subject matter of Example 33 optionally includes, wherein receiving the confirmation from the third device includes receiving a second challenge from the third device.

In Example 35, the subject matter of Example 34 optionally includes, further comprising: determining, in response to receiving the second challenge, a second verification to the second challenge using a second private secret value; and sending the second verification to the second device.

In Example 36, the subject matter of any one or more of Examples 30-35 optionally include, wherein receiving confirmation from the third device includes receiving confirmation from the third device that the challenge verification was successfully verified by a fourth device, and wherein the third device is in communication with the second device via the fourth device.

In Example 37, the subject matter of any one or more of Examples 30-36 optionally include, wherein determining the public test value includes using a public constant.

In Example 38, the subject matter of Example 37 optionally includes, wherein sending the public test value to the second device includes sending the public constant to the second device.

In Example 39, the subject matter of any one or more of Examples 30-38 optionally include, wherein the first device is an Internet of Things device.

In Example 40, the subject matter of any one or more of Examples 30-39 optionally include, wherein the trusted environment includes an Institute of Electrical and Electronics Engineers (IEEE) 802.11 wireless network.

In Example 41, the subject matter of Example 40 optionally includes, wherein receiving, at the first device outside the trusted environment, the challenge from the third device includes receiving the challenge over an unsecured network.

Example 42 is an apparatus to create a chain of trust, comprising: means for generating a private secret value; means for determining a public test value using the private secret value; means for sending, from a first device in a trusted environment with a second device and a third device, the public test value to the second device; means for receiving, at the first device outside the trusted environment, a challenge from a third device, the third device in communication with the second device; means for determining a verification to the challenge using the private secret value; means for sending, from the first device outside the trusted environment, the challenge verification to the second device; and means for receiving, at the first device outside the trusted environment, confirmation from the third device that the challenge verification was successfully verified by the second device and the third device.

In Example 43, the subject matter of Example 42 optionally includes, further comprising means for sending a secure communication to the third device via the second device using the chain of trust.

In Example 44, the subject matter of any one or more of Examples 42-43 optionally include, wherein the public test value and the verification are determined using a modulus value, the modulus value including a product of two large, distinct prime numbers.

In Example 45, the subject matter of any one or more of Examples 42-44 optionally include, wherein the means for sending the challenge verification to the second device include means for sending a second public test value to the second device.

In Example 46, the subject matter of Example 45 optionally includes, wherein the means for receiving the confirmation from the third device include means for receiving a second challenge from the third device.

In Example 47, the subject matter of Example 46 optionally includes, further comprising: means for determining, in response to receiving the second challenge, a second verification to the second challenge using a second private secret value; and means for sending the second verification to the second device.

In Example 48, the subject matter of any one or more of Examples 42-47 optionally include, wherein the means for receiving confirmation from the third device include means for receiving confirmation from the third device that the challenge verification was successfully verified by a fourth device, and wherein the third device is in communication with the second device via the fourth device.

In Example 49, the subject matter of any one or more of Examples 42-48 optionally include, wherein the means for determining the public test value include using a public constant.

In Example 50, the subject matter of Example 49 optionally includes, wherein the means for sending the public test value to the second device include means for sending the public constant to the second device.

In Example 51, the subject matter of any one or more of Examples 42-50 optionally include, wherein the first device is an Internet of Things device.

In Example 52, the subject matter of any one or more of Examples 42-51 optionally include, wherein the trusted environment includes an Institute of Electrical and Electronics Engineers (IEEE) 802.11 wireless network.

In Example 53, the subject matter of Example 52 optionally includes, wherein the means for receiving, at the first device outside the trusted environment, the challenge from the third device include means for receiving the challenge over an unsecured network.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. At least one non-transitory machine readable medium including instructions that, when executed by a machine, cause the machine to perform operations for creating a chain of trust, the operations comprising:
   generating, at a first device, a private secret value, a public constant, a modulus value, and a random test value;
   determining a public value using the private secret value, the public constant, and the modulus value;
   determining a public test value using the public constant, the modulus value, and the random test value;
   sending, from the first device in a trusted environment with a second device and a third device, the public constant, the modulus value, the public value, and the public test value to the second device;
   receiving, at the first device outside the trusted environment, a random challenge value from the third device, the third device in communication with the second device, the third device having received a test value from the second device, and the random challenge value generated in response to receiving the test value;
   determining a verification to the random challenge value using the random test value, the private secret value, the random challenge value, and the modulus value;
   sending, from the first device outside the trusted environment, the verification to the second device; and
   receiving, at the first device outside the trusted environment, a confirmation from the third device that the verification was successfully verified by the second device and the third device.

2. The machine readable medium of claim 1, further comprising sending a secure communication to the third device via the second device after receiving the confirmation.

3. The machine readable medium of claim 1, wherein the public test value and the verification are determined using the modulus value, the modulus value including a product of two large, distinct prime numbers.

4. The machine readable medium of claim 1, wherein sending the verification to the second device includes sending a second public test value to the second device.

5. The machine readable medium of claim 4, wherein receiving the confirmation from the third device includes receiving a second challenge from the third device.

6. The machine readable medium of claim 5, the operations further comprising:
   determining, in response to receiving the second challenge, a second verification to the second challenge using a second private secret value; and
   sending the second verification to the second device.

7. The machine readable medium of claim 1, wherein receiving the confirmation from the third device includes receiving the confirmation from the third device that the verification was successfully verified by a fourth device, and wherein the third device is in communication with the second device via the fourth device.

8. The machine readable medium of claim 1, wherein the first device is an Internet of Things wearable device.

9. The machine readable medium of claim 1, wherein the trusted environment includes an Institute of Electrical and Electronics Engineers (IEEE) 802.11 wireless network.

10. The machine readable medium of claim 9, wherein receiving, at the first device outside the trusted environment, the challenge from the third device includes receiving the challenge over an unsecured network.

11. A first device for communicating over a chain of trust, the first device comprising:
    processor logic, implemented at least partly in hardware, to:

generate a private secret value, a public constant, a modulus value, and a random test value; and
determine a public value using the private secret value, the public constant, and the modulus value;
determining a public test value using the public constant, the modulus value, and the random test value; and
transceiver logic, implemented at least partly in hardware, to:
send, over a trusted connection with a second device, the public constant, the modulus value, the public value, and the public test value to the second device;
receive, outside the trusted connection, a random challenge value from a third device, the third device in communication with the second device, the third device having received a test value from the second device, and the random challenge value generated in response to receiving the test value;
send, outside the trusted connection, a verification to the random challenge value to the second device, the verification determined by the processor logic using the random test value, the private secret value, the random challenge value, and the modulus value; and
receive, outside the trusted connection, a confirmation from the third device that the verification was successfully verified by the second device and the third device.

12. The device of claim 11, wherein the transceiver logic is further to send a secure communication to the third device via the second device after receiving the confirmation.

13. The device of claim 11, wherein the public test value is determined using the modulus value, the modulus value including a product of two large, distinct prime numbers.

14. The device of claim 11, wherein to send the verification to the second device includes to send a second public test value to the second device.

15. The device of claim 14, wherein to receive the confirmation from the third device includes to receive a second challenge from the third device.

16. The device of claim 15, wherein the processing logic is to determine, in response to receiving the second challenge, a second verification to the second challenge using a second private secret value; and
wherein the transceiver logic is to send the second verification to the second device.

17. The device of claim 11, wherein to receive the confirmation from the third device includes to receive confirmation from the third device that the verification was successfully verified by a fourth device, and wherein the third device is in communication with the second device via the fourth device.

18. At least one non-transitory machine readable medium including instructions that, when executed by a machine, cause the machine to perform operations for creating a chain of trust, the operations comprising:
generating, at a first device, a private secret value, a public constant, a modulus value, and a random test value;
determining a public value using the private secret value, the public constant, and the modulus value;
determining a public test value using the public constant, the modulus value, and the random test value;
sending, from the first device in a trusted environment with a second device and a third device, the public constant, the modulus value, the public value, and the public test value to the second device;
receiving, at the first device outside the trusted environment, a random challenge value from the third device, the third device in communication with the second device;
determining a challenge verification value using the random test value, the private secret value, the random challenge value, and the modulus value; and
sending, from the first device outside the trusted environment, the challenge verification value to the second device.

19. The machine readable medium of claim 18, the operations further comprising receiving, at the first device outside the trusted environment, confirmation from the third device that the challenge verification value was successfully verified by the second device and the third device.

20. A method to create a chain of trust, the method comprising:
generating, at a first device, a private secret value, a public constant, a modulus value, and a random test value;
determining a public value using the private secret value, the public constant, and the modulus value;
determining a public test value using the public constant, the modulus value, and the random test value;
sending, from the first device in a trusted environment with a second device and a third device, the public constant, the modulus value, the public value, and the public test value to the second device;
receiving, at the first device outside the trusted environment, a random challenge value from the third device, the third device in communication with the second device, the third device having received a test value from the second device, and the random challenge value generated in response to receiving the test value;
determining a verification to the random challenge value using the random test value, the private secret value, the random challenge value, and the modulus value;
sending, from the first device outside the trusted environment, the verification to the second device; and
receiving, at the first device outside the trusted environment, a confirmation from the third device that the verification was successfully verified by the second device and the third device.

21. The method of claim 20, further comprising sending a secure communication to the third device via the second device after receiving the confirmation.

22. The method of claim 20, wherein the public test value and the verification are determined using the modulus value, the modulus value including a product of two large, distinct prime numbers.

* * * * *